(12) United States Patent
Uto et al.

(10) Patent No.: US 10,995,875 B2
(45) Date of Patent: May 4, 2021

(54) THERMAL MANAGEMENT SYSTEM FOR VEHICLE

(71) Applicant: Honda Motor Co., Ltd., Tokyo (JP)

(72) Inventors: Hajime Uto, Saitama (JP); Masanobu Takazawa, Saitama (JP); Masayuki Toyokawa, Saitama (JP); Naoaki Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 16/458,196

(22) Filed: Jul. 1, 2019

(65) Prior Publication Data
US 2020/0003320 A1 Jan. 2, 2020

(30) Foreign Application Priority Data

Jul. 2, 2018 (JP) .............................. JP2018-125954

(51) Int. Cl.
*F16K 31/00* (2006.01)
*B60H 1/00* (2006.01)
*B60H 1/34* (2006.01)

(52) U.S. Cl.
CPC ....... *F16K 31/002* (2013.01); *B60H 1/00278* (2013.01); *B60H 1/00885* (2013.01); *B60H 1/3421* (2013.01); *B60H 2001/3471* (2013.01)

(58) Field of Classification Search
CPC .............. F16K 31/002; B60H 1/00885; B60H 1/00278; B60H 1/3421; B60H 1/143; B60H 2001/3471; B60H 2001/00307; Y02T 10/88; B60K 11/02; B60K 11/085; B60K 11/04; B60K 2001/005; B60K 1/00; B60K 2001/008; F01P 2007/146; F01P 3/20; F01P 3/12; F01P 3/00; F01P 7/165; F01P 7/12; F01P 7/14; F01P 7/16; F01P 2050/24
See application file for complete search history.

(56) References Cited

U.S. PATENT DOCUMENTS

| 9,649,909 | B2 * | 5/2017 | Enomoto | B60W 20/00 |
| 2014/0041826 | A1 * | 2/2014 | Takeuchi | B60H 1/00899 165/10 |
| 2014/0123917 | A1 * | 5/2014 | Chellan | F01P 7/10 123/41.04 |

(Continued)

FOREIGN PATENT DOCUMENTS

JP 2015200194 11/2015

*Primary Examiner* — Emmanuel E Duke
(74) *Attorney, Agent, or Firm* — JCIPRNET (57) ABSTRACT

The thermal management system includes a cooling circuit in which cooling water circulates, a heat exchange circuit in which cooling water performing heat exchange with a battery flows, a flow rate control valve which adjusts a flow rate of cooling water flowing from the cooling circuit to the heat exchange circuit, a shutter which adjusts an introduction amount of outside air into an engine room, and an ECU which controls an opening degree of the flow rate control valve and an opening degree of the shutter. The ECU controls the shutter and the flow rate control valve to be in a fully closed state when a cooling water temperature is less than a valve opening temperature of a thermostat valve and controls the shutter and the flow rate control valve to be in an open state when the cooling water temperature is greater than the valve opening temperature.

20 Claims, 5 Drawing Sheets

(56) References Cited

U.S. PATENT DOCUMENTS

| | | | |
|---|---|---|---|
| 2015/0258875 A1* | 9/2015 | Enomoto | B60L 3/00 |
| | | | 165/104.31 |
| 2016/0031291 A1* | 2/2016 | Enomoto | B60H 1/00385 |
| | | | 62/179 |
| 2016/0318499 A1* | 11/2016 | Yamanaka | B60H 1/00899 |
| 2016/0332505 A1* | 11/2016 | Yamanaka | B60H 1/00428 |
| 2018/0264913 A1* | 9/2018 | Enomoto | B60L 58/27 |
| 2018/0371982 A1* | 12/2018 | Bilancia | F02F 1/40 |
| 2019/0160917 A1* | 5/2019 | Kim | B60H 1/00271 |
| 2019/0168578 A1* | 6/2019 | Kim | B60H 1/323 |
| 2019/0234292 A1* | 8/2019 | Gonze | F01P 5/10 |

* cited by examiner

THERMAL MANAGEMENT SYSTEM FOR VEHICLE

CROSS REFERENCE TO RELATED APPLICATION

This application claims the priority benefit of Japan application serial no. 2018-125954, filed on Jul. 2, 2018. The entirety of the above-mentioned patent application is hereby incorporated by reference herein and made a part of this specification.

BACKGROUND

Technical Field

The disclosure relates to a thermal management system for a vehicle. More particularly, the disclosure relates to a thermal management system for a vehicle which heats vehicle devices other than the engine with waste heat of the engine.

Description of Related Art

In a vehicle equipped with an engine as a driving force generation source, heat generated by the engine during traveling is radiated by the radiator as waste heat to the outside air in most cases. Therefore, in recent years, a thermal management system has been proposed which heats various vehicle devices other than the engine, such as a battery and a transmission, with cooling water that has become high temperature due to the waste heat of the engine. According to the vehicle equipped with such a thermal management system, since the vehicle devices can be heated by the heat energy conventionally radiated as waste heat to the outside air, the energy efficiency of the entire vehicle can be improved.

Incidentally, the time when heating of the vehicle devices is requested is often immediately after the start of the vehicle, that is, when the engine is in the process of warming up. For this reason, in the thermal management system, it is important to secure the high temperature cooling water as early as possible. However, when the temperature of the outside air is low, since a cold traveling wind flows into the engine room, and the engine is directly cooled by the traveling wind, it is difficult to secure high temperature cooling water at an early stage.

RELATED ART

Patent Document

[Patent Document 1] Japanese Laid-open No. 2015-200194

Technical Problem

In order to solve such a problem, it is conceivable to provide a grille shutter, such as one shown by Patent Document 1, in the front grille of the vehicle so that cold outside air does not flow into the engine room. However, conventionally, it has not been fully considered how the control of the grille shutter and the heating control which heats the vehicle devices with the cooling water of the engine are specifically combined to be capable of securing high temperature cooling water at an early stage without impeding the warm-up and cooling of the engine.

SUMMARY

A thermal management system (such as the thermal management system 1 described below) for a vehicle (such as the vehicle V described below) according to the disclosure includes: a cooling circuit (such as the cooling circuit 3 described below) in which cooling water performing heat exchange with an engine (such as the engine 2 described below) circulates; a heat exchange circuit (such as the first heat exchange circuit 5 and the second heat exchange circuit 4 described below) which is connected to the cooling circuit and in which cooling water performing heat exchange with vehicle devices other than the engine flows; a flow rate control valve (such as the first flow rate control valve 59 and the second flow rate control valve 46 described below) which adjusts a flow rate of cooling water flowing from the cooling circuit to the heat exchange circuit; a radiator (such as the engine radiator 35 described below) which is connected to the cooling circuit to perform heat exchange between cooling water and the atmosphere; a radiator valve (such as the thermostat valve 33 described below) which adjusts a flow rate of cooling water flowing from the cooling circuit to the radiator; a shutter (such as the grille shutter 6 described below) which adjusts an introduction amount of outside air from a front grille (such as the front grille G described below) into an engine room (such as the engine room R described below); a cooling water temperature acquirer (such as the cooling water temperature sensor 36 described below) which acquires a cooling water temperature of the cooling circuit; and a controller (such as the ECU 7 described below) which controls an opening degree of the flow rate control valve and an opening degree of the shutter, wherein the controller controls the shutter and the flow rate control valve to be in a closed state when the cooling water temperature is less than a valve opening temperature of the radiator valve and controls the shutter and the flow rate control valve to be in an open state when the cooling water temperature is greater than the valve opening temperature.

A thermal management system (such as the thermal management system 1A described below) for a vehicle (such as the vehicle VA described below) according to the disclosure includes: a cooling circuit (such as the cooling circuit 3 described below) in which cooling water performing heat exchange with an engine (such as the engine 2 described below) circulates; a heat exchange circuit (such as the first heat exchange circuit 5 and the second heat exchange circuit 4 described below) which is connected to the cooling circuit and in which cooling water performing heat exchange with vehicle devices other than the engine flows; a flow rate control valve (such as the first flow rate control valve 59 and the second flow rate control valve 46 described below) which adjusts a flow rate of cooling water flowing from the cooling circuit to the heat exchange circuit; a radiator (such as the engine radiator 35 described below) which is connected to the cooling circuit to perform heat exchange between cooling water and the atmosphere; a radiator valve (such as the thermostat valve 33 described below) which adjusts a flow rate of cooling water flowing from the cooling circuit to the radiator; a heat retaining container (such as the heat insulating capsule 8 described below) which accommodates at least the engine; a shutter (such as the outside air shutter 9 described below) which adjusts an introduction amount of outside air from an outside air introduction port (such as the outside air introduction port 81 described below) formed in the heat retaining container into the heat retaining container; a cooling water temperature acquirer (such as the cooling water temperature sensor 36 described below) which acquires a cooling water temperature of the cooling circuit; and a controller (such as the ECU 7A described below) which controls an opening degree of the flow rate control valve and an opening degree of the shutter, wherein the controller controls the shutter and the flow rate control valve to be in a closed state when the cooling water temperature is less than a valve opening temperature of the radiator valve and controls the shutter and the flow rate control valve to be in an open state when the cooling water temperature is greater than the valve opening temperature.

DESCRIPTION OF THE EMBODIMENTS

The disclosure provides a thermal management system for a vehicle which can secure high temperature cooling water at an early stage and heat vehicle devices other than the engine with the high temperature cooling water without impeding the warm-up and cooling of the engine.

Solution to the Problem (1) A thermal management system (such as the thermal management system 1 described below) for a vehicle (such as the vehicle V described below) according to the disclosure includes: a cooling circuit (such as the cooling circuit 3 described below) in which cooling water performing heat exchange with an engine (such as the engine 2 described below) circulates; a heat exchange circuit (such as the first heat exchange circuit 5 and the second heat exchange circuit 4 described below) which is connected to the cooling circuit and in which cooling water performing heat exchange with vehicle devices other than the engine flows; a flow rate control valve (such as the first flow rate control valve 59 and the second flow rate control valve 46 described below) which adjusts a flow rate of cooling water flowing from the cooling circuit to the heat exchange circuit; a radiator (such as the engine radiator 35 described below) which is connected to the cooling circuit to perform heat exchange between cooling water and the atmosphere; a radiator valve (such as the thermostat valve 33 described below) which adjusts a flow rate of cooling water flowing from the cooling circuit to the radiator; a shutter (such as the grille shutter 6 described below) which adjusts an introduction amount of outside air from a front grille (such as the front grille G described below) into an engine room (such as the engine room R described below); a cooling water temperature acquirer (such as the cooling water temperature sensor 36 described below) which acquires a cooling water temperature of the cooling circuit; and a controller (such as the ECU 7 described below) which controls an opening degree of the flow rate control valve and an opening degree of the shutter, wherein the controller controls the shutter and the flow rate control valve to be in a closed state when the cooling water temperature is less than a valve opening temperature of the radiator valve and controls the shutter and the flow rate control valve to be in an open state when the cooling water temperature is greater than the valve opening temperature.

(2) A thermal management system (such as the thermal management system 1A described below) for a vehicle (such as the vehicle VA described below) according to the disclosure includes: a cooling circuit (such as the cooling circuit 3 described below) in which cooling water performing heat exchange with an engine (such as the engine 2 described below) circulates; a heat exchange circuit (such as the first heat exchange circuit 5 and the second heat exchange circuit 4 described below) which is connected to the cooling circuit and in which cooling water performing heat exchange with vehicle devices other than the engine flows; a flow rate control valve (such as the first flow rate control valve 59 and the second flow rate control valve 46 described below) which adjusts a flow rate of cooling water flowing from the cooling circuit to the heat exchange circuit; a radiator (such as the engine radiator 35 described below) which is connected to the cooling circuit to perform heat exchange between cooling water and the atmosphere; a radiator valve (such as the thermostat valve 33 described below) which adjusts a flow rate of cooling water flowing from the cooling circuit to the radiator; a heat retaining container (such as the heat insulating capsule 8 described below) which accommodates at least the engine; a shutter (such as the outside air shutter 9 described below) which adjusts an introduction amount of outside air from an outside air introduction port (such as the outside air introduction port 81 described below) formed in the heat retaining container into the heat retaining container; a cooling water temperature acquirer (such as the cooling water temperature sensor 36 described below) which acquires a cooling water temperature of the cooling circuit; and a controller (such as the ECU 7A described below) which controls an opening degree of the flow rate control valve and an opening degree of the shutter, wherein the controller controls the shutter and the flow rate control valve to be in a closed state when the cooling water temperature is less than a valve opening temperature of the radiator valve and controls the shutter and the flow rate control valve to be in an open state when the cooling water temperature is greater than the valve opening temperature.

(3) In this case, it is preferable that the controller controls the flow rate control valve to be in the open state when the cooling water temperature is greater than or equal to the valve opening temperature and less than a temperature at which the shutter is controlled to be in the open state and starts a heating control which supplies cooling water from the cooling circuit to the heat exchange circuit.

(4) In this case, it is preferable that the vehicle includes the engine and a driving motor as driving force generation sources, that the vehicle devices include an electric power storage device (such as the battery B described below) which supplies electric power to the driving motor, that the heat exchange circuit includes a first heat exchange circuit (such as the first heat exchange circuit 5 described below) in which cooling water performing heat exchange with the electric power storage device flows, and that the flow rate control valve includes a first flow rate control valve (such as the first flow rate control valve 59 described below) which adjusts a flow rate of cooling water flowing from the cooling circuit to the first heat exchange circuit.

(5) In this case, it is preferable that the controller controls an opening degree of the first flow rate control valve so that the cooling water temperature does not become less than or equal to the valve opening temperature.

(6) In this case, it is preferable that a heater which heats the electric power storage device is not provided in the first heat exchange circuit.

(7) In this case, it is preferable that the heat exchange circuit includes a second heat exchange circuit (such as the second heat exchange circuit 4 described below) in which cooling water performing heat exchange with another device (such as the transmission T described below) among the vehicle devices other than the electric power storage device flows, and that the flow rate control valve includes a second flow rate control valve (such as the second flow rate control valve 46 described below) which adjusts a flow rate of cooling water flowing from the cooling circuit to the second heat exchange circuit, wherein the controller controls the second flow rate control valve to be in a closed state when the cooling water temperature is less than the valve opening temperature and a temperature of the electric power storage device is less than a predetermined temperature (such as the battery heating request temperature Tb_th described below) and controls the second flow rate control valve to be in an open state when the cooling water temperature is greater than the valve opening temperature and the temperature of the electric power storage device is greater than the predetermined temperature.

Effects (1) In the thermal management system of the disclosure, the heat exchange circuit in which the cooling water performing heat exchange with the vehicle devices other than the engine flows and the radiator are connected to the cooling circuit of the engine; the flow rate of the cooling water flowing from the cooling circuit to the heat exchange circuit is adjusted by the flow rate control valve; and the flow rate of the cooling water flowing from the cooling circuit to the radiator is adjusted by the radiator valve. Further, the introduction amount of the outside air from the front grille into the engine room is adjusted by the shutter. In such a thermal management system, since the introduction amount of the outside air from the front grille into the engine room is limited when the shutter is closed, the heat radiation amount from the engine to the outside air is reduced; further, as the temperature rising rate of the cooling water flowing in the cooling circuit increases, the heat discarded from the radiator can be efficiently transferred to the vehicle devices and can heat these vehicle devices. However, if the shutter is kept closed, the temperature of the cooling water may rise too much, and there is concern that this may impede the cooling of the engine by the radiator. Therefore, the controller controls the shutter to be in the open state in response to the cooling water temperature exceeding a predetermined temperature set to be greater than the valve opening temperature of the radiator valve, thereby able to secure the introduction amount of the outside air and to prevent the excessive temperature rise of the cooling water of the engine. Further, when the cooling water is supplied from the cooling circuit to the heat exchange circuit, since the cooling water cooled by heat exchange with the vehicle devices is supplied from the heat exchange circuit to the cooling circuit, there is a concern that the temperature of the cooling water flowing in the cooling circuit may decrease, and the warm-up of the engine may be impeded. Therefore, the controller controls the shutter and the flow rate control valve to be in the closed state when the cooling water temperature is less than the valve opening temperature of the radiator valve, that is, before the cooling of the cooling water by the radiator is started. This can prevent the warm-up of the engine from being impeded.

(2) The thermal management system according to the disclosure is different from the thermal management system described in (1) above in that the engine is accommodated in the heat retaining container and that the introduction amount of the outside air from the outside air introduction port formed in the heat retaining container into the heat retaining container is adjusted by the shutter. Therefore, according to the disclosure, the same effects as the above (1) can be obtained.

(3) When the shutter is opened when the radiator valve is in the open state, the heat radiation amount from the engine to the outside air increases, and the heat radiation amount from the cooling water by heat exchange with the outside air in the radiator also increases; therefore, there is a concern that the cooling water temperature may decrease and that the vehicle devices may not be efficiently heated with the waste heat of the engine. In response to this, the disclosure controls the flow rate control valve to be in the open state when the cooling water temperature is greater than or equal to the valve opening temperature of the radiator valve and less than the temperature at which the shutter is controlled to be in the open state. In this way, by controlling the shutter to be in the open state, the waste heat of the engine before being radiated to the outside air can be used to efficiently heat the vehicle devices.

(4) In the disclosure, a vehicle device which is an object to be heated by the cooling water flowing in the cooling circuit of the engine is set as an electric power storage device which supplies electric power to a driving motor of a hybrid vehicle. The electric power storage device of the hybrid vehicle may need to be heated as quickly as possible in order to exert its charge/discharge performance in some cases. Since the electric power storage device of the hybrid vehicle has a large heat capacity, when the heating control of the electric power storage device is performed and the cooling water is exchanged between the cooling circuit of the engine and the first heat exchange circuit of the electric power storage device, the temperature of the cooling water in the cooling circuit greatly decreases. As a result, the warm-up of the engine is likely to be impeded. Therefore, according to the thermal management system of the disclosure, it is possible to heat the electric power storage device with the cooling water that has become high temperature due to the engine without impeding the warm-up of the engine.

(5) As described above, since the electric power storage device has a large heat capacity, when the heating control is performed, the temperature of the cooling water in the cooling circuit is likely to decrease. Further, there is a concern that the cooling water temperature may decrease and become less than the valve opening temperature of the radiator valve, that this may impede the warm-up of the engine, and that the fuel efficiency may be deteriorated. Therefore, the controller controls the opening degree of the first flow rate control valve so that the cooling water temperature does not become less than or equal to the valve opening temperature of the radiator valve. In this way, the electric power storage device can be heated without impeding the warm-up of the engine.

(6) In the disclosure, a heater which heats the electric power storage device is not provided in the first heat exchange circuit. Therefore, according to the disclosure, since the electric power storage device can be heated by the waste heat of the engine without using a heater, the energy efficiency of the entire vehicle can be improved.

(7) Though the hybrid vehicle is equipped with various devices, such as the electric power storage device and the transmission, as devices requesting heating at the time of start, among these various devices, it is preferable to heat the electric power storage device with priority in order to ensure the traveling performance of the hybrid vehicle immediately after the start. Further, when the second flow rate control valve is controlled to be in the open state, the cooling water flows from the cooling circuit to the second heat exchange circuit, and another device is heated by this cooling water. However, in this case, since the temperature of the cooling water decreases due to the heat exchange with the another device, there is a concern that the warm-up of the electric power storage device may be impeded. Therefore, in this disclosure, the controller controls the second flow rate control valve to be in the closed state when the cooling water temperature is less than the valve opening temperature and the temperature of the electric power storage device is less than the predetermined temperature, and the controller controls the second flow rate control valve to be in the open state when the cooling water temperature is greater than the valve opening temperature and the temperature of the electric power storage device is greater than the predetermined temperature. In this way, since the second flow rate control valve is controlled to be in the closed state at least until the electric power storage device reaches the predetermined temperature, the electric power storage device can be heated with priority.

<First Embodiment>

Hereinafter, a first embodiment of the disclosure will be described with reference to the drawings.

Figure 1:
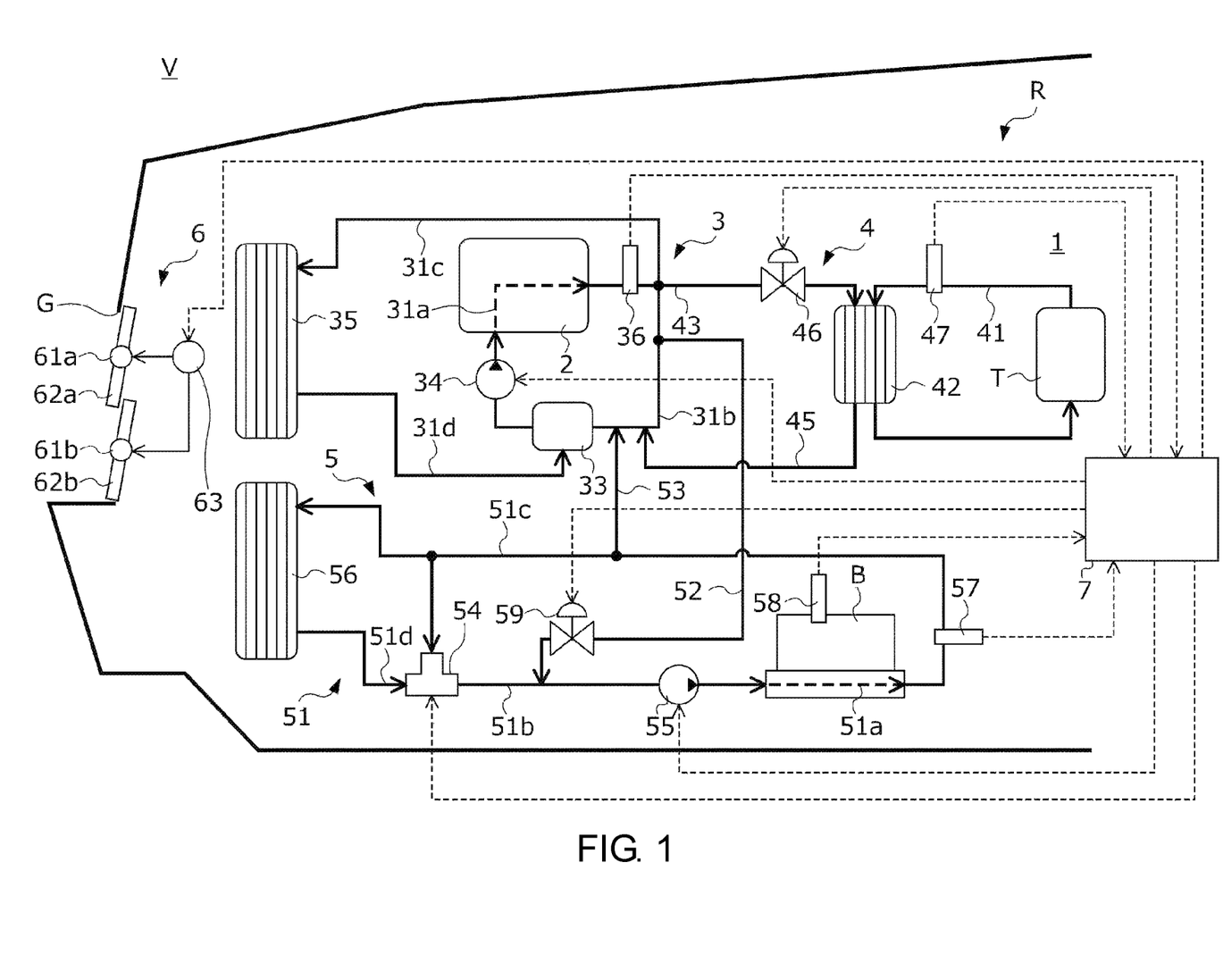
FIG. 1 is a diagram showing a configuration of a thermal management system according to a first embodiment of the disclosure and a vehicle equipped with the thermal management system.

FIG. 1 is a diagram showing a configuration of a thermal management system 1 according to the embodiment and a vehicle V equipped with the thermal management system 1.

The thermal management system 1 is equipped on the vehicle V which is a so-called hybrid vehicle including at least an internal combustion engine 2 (hereinafter referred to as the "engine") and a driving motor as driving force generation sources. As shown in FIG. 1, the thermal management system 1 is provided in an engine room R on the front side of the vehicle V together with the engine 2. The thermal management system 1 heats vehicle devices other than the engine 2 with the waste heat generated by the engine 2. The following describes a case in which, among various vehicle devices equipped on the vehicle V, a transmission T which shifts the driving force generated by the engine 2 and the driving motor and transmits it to the driving wheels and oil of the transmission T and a battery B which supplies electric power to the driving motor serve as objects to be heated by the waste heat of the engine 2 in the thermal management system 1, but the disclosure is not limited thereto.

The thermal management system 1 includes a cooling circuit 3 which includes the engine 2 in a part of its path and in which cooling water circulates; an oil circulation circuit 41 in which the oil of the transmission T circulates; a second heat exchange circuit 4 which is connected to the cooling circuit 3 and in which cooling water performing heat exchange with the transmission T via the oil circulation circuit 41 flows; a first heat exchange circuit 5 which is connected to the cooling circuit 3 and in which cooling water performing heat exchange with the battery B flows; a grille shutter 6 provided on a front grille G which is an opening for introducing a traveling wind into the engine room R; and an electric control unit 7 (hereinafter abbreviated as the "ECU 7") which controls the cooling circuit 3, the first heat exchange circuit 5, the second heat exchange circuit 4 and the grille shutter 6.

The cooling circuit 3 includes a cooling water circulation passage 31 in which cooling water performing heat exchange with the engine 2 circulates; and a thermostat valve 33 as a radiator valve, a water pump 34, an engine radiator 35, and a cooling water temperature sensor 36 provided in the cooling water circulation passage 31.

The cooling water circulation passage 31 includes a first cooling water passage 31a, a second cooling water passage 31b, a third cooling water passage 31c, and a fourth cooling water passage 31d. The first cooling water passage 31a is a passage of cooling water formed in a cylinder block of the engine 2 and promotes heat exchange between the cooling water and the engine 2. The second cooling water passage 31b is a cooling water passage connecting the outlet of the first cooling water passage 31a and the inlet of the first cooling water passage 31a.

The cooling water temperature sensor 36, the thermostat valve 33, and the water pump 34 are provided in the second cooling water passage 31b sequentially from the outlet side toward the inlet side of the first cooling water passage 31a.

The third cooling water passage 31c is a cooling water passage connecting the outlet of the first cooling water passage 31a and the inlet of the engine radiator 35. The fourth cooling water passage 31d is a cooling water passage connecting the outlet of the engine radiator 35 and the water pump 34 provided in the second cooling water passage 31b.

The engine radiator 35 is provided near the front grille G in the engine room R. The cooling water flowing in from the third cooling water passage 31c is cooled by heat exchange with the atmosphere, which is a traveling wind introduced from the front grille G, in the process of flowing through the cooling water passage formed in the engine radiator 35 and flows out to the fourth cooling water passage 31d.

The cooling water temperature sensor 36 transmits to the ECU 7 a detection signal corresponding to the cooling water temperature, which is the temperature of the cooling water flowing out from the outlet of the first cooling water passage 31a.

The water pump 34 operates in response to a command signal transmitted from the ECU 7 and pressure-feeds the cooling water in the second cooling water passage 31b from the side of the thermostat valve 33 to the side of the engine 2. The flow of the cooling water in the cooling water circulation passage 31 is formed by the water pump 34. The ECU 7 basically constantly keeps driving the water pump 34 from the start of the engine 2 to the stop of the engine 2 again and makes the cooling water circulate in the cooling water circulation passage 31.

The thermostat valve 33 is a valve which adjusts the flow rate of the cooling water flowing from the cooling water circulation passage 31 to the engine radiator 35. The thermostat valve 33 adjusts the flow rate of the cooling water flowing from the cooling water circulation passage 31 to the engine radiator 35 by opening and closing the cooling water passage connecting the fourth cooling water passage 31d and the second cooling water passage 31b.

The thermostat valve 33 is maintained in the fully closed state when the temperature of the cooling water flowing in the second cooling water passage 31b is less than or equal to a predetermined valve opening temperature Tth1 (specifically, for example, Tth1=80° C.). When the thermostat valve 33 is in the fully closed state, the flow of the cooling water from the fourth cooling water passage 31d to the second cooling water passage 31b is shut off. That is, the flow rate of the cooling water flowing from the third cooling water passage 31c to the engine radiator 35 becomes 0. Therefore, when the thermostat valve 33 is in the fully closed state, the cooling water circulates in the circulation passage formed by the first cooling water passage 31a and the second cooling water passage 31b.

The thermostat valve 33 starts to open from the fully closed state when the temperature of the cooling water flowing in the second cooling water passage 31b exceeds the valve opening temperature Tth1. When the thermostat valve 33 opens, the circulation passage of the cooling water is formed by the first cooling water passage 31a, the third cooling water passage 31c, the engine radiator 35, the fourth cooling water passage 31d, and the second cooling water passage 31b. Therefore, when the thermostat valve 33 starts to open, the cooling water starts to flow from the third cooling water passage 31c to the engine radiator 35. Further, the opening degree of the thermostat valve 33 increases as the temperature of the cooling water flowing in the second cooling water passage 31b increases. Therefore, the flow rate of the cooling water flowing from the third cooling water passage 31c to the engine radiator 35 increases as the temperature of the cooling water increases.

The thermostat valve 33 becomes the fully open state when the temperature of the cooling water flowing in the second cooling water passage 31b exceeds a fully open temperature Tth2 (specifically, for example, Tth2=90° C.) higher than the valve opening temperature Tth1. Therefore, the flow rate of the cooling water flowing from the third cooling water passage 31c to the engine radiator 35 becomes maximal when the thermostat valve 33 becomes the fully open state.

The grille shutter 6 includes a plurality of rotating shafts 61a and 61b provided in the front grille G, a plurality of plate-shaped shutter members 62a and 62b rotatably provided with the rotating shafts 61a and 61b as the center, and an electric actuator 63 which rotates the shutter members 62a and 62b with the rotating shafts 61a and 61b as the center in response to the command signal transmitted from the ECU 7.

When the opening degree of the shutter members 62a and 62b is set to a predetermined fully closed opening degree by the electric actuator 63, the shutter members 62a and 62b become substantially parallel to the opening surface of the front grille G, as shown in FIG. 1. In this way, the introduction amount of the traveling wind from the front grille G into the engine room R becomes minimal. When the opening degree of the shutter members 62a and 62b is set to a predetermined fully open opening degree by the electric actuator 63, the shutter members 62a and 62b become substantially perpendicular to the opening surface of the front grille G. In this way, the introduction amount of the traveling wind from the front grille G into the engine room R becomes maximal. Therefore, the introduction amount of the traveling wind from the front grille G into the engine room R can be adjusted by controlling the opening degree of the shutter members 62a and 62b between the fully closed opening degree and the fully open opening degree under the control of the ECU 7.

The second heat exchange circuit 4 includes an oil heat exchanger 42 in which the passage of the cooling water and the oil passage of the transmission T are formed, a second introduction passage 43 and a second discharge passage 45 which connect the oil heat exchanger 42 and the cooling circuit 3, a second flow rate control valve 46, and an oil temperature sensor 47.

The second introduction passage 43 is a cooling water passage which is connected between the cooling water temperature sensor 36 and the thermostat valve 33 in the second cooling water passage 31b and is connected to a cooling water introduction port formed in the oil heat exchanger 42. A part of the cooling water flowing in the second cooling water passage 31b is supplied to the oil heat exchanger 42 via the second introduction passage 43. The second discharge passage 45 is a cooling water passage that connects a cooling water discharge port formed in the oil heat exchanger 42 and a downstream side of a part where the second introduction passage 43 is connected in the second cooling water passage 31b. When the cooling water is supplied to the oil heat exchanger 42 via the second introduction passage 43, the cooling water in the oil heat exchanger 42 is discharged to the second cooling water passage 31b via the second discharge passage 45.

The oil heat exchanger 42 performs heat exchange between the cooling water supplied from the second introduction passage 43 and the oil supplied from the transmission T in the oil circulation circuit 41. Thus, in a case where the temperature of the cooling water supplied to the oil heat exchanger 42 is higher than the temperature of the oil circulating in the oil circulation circuit 41, the temperature of the oil can rise in the process of passing through the oil heat exchanger 42, and the viscosity of the oil can be lowered.

The second flow rate control valve 46 is a valve that adjusts the flow rate of the cooling water flowing from the second cooling water passage 31b to the oil heat exchanger 42 and is provided in the second introduction passage 43. The opening degree of the second flow rate control valve 46 is controlled by the ECU 7. As described above, when the water pump 34 is driven to circulate the cooling water in the cooling water circulation passage 31 and the second flow rate control valve 46 is opened, a part of the cooling water flowing in the second cooling water passage 31b flows into the oil heat exchanger 42 via the introduction passage 43, passes through the oil heat exchanger 42, and returns to the second cooling water passage 31b.

The oil temperature sensor 47 transmits to the ECU 7 a detection signal corresponding to the oil temperature, which is the temperature of the oil circulating in the oil circulation circuit 41.

The first heat exchange circuit 5 includes a battery cooling water circulation circuit 51 in which cooling water performing heat exchange with the battery B is circulated; a first introduction passage 52 and a first discharge passage 53 which connect the battery cooling water circulation circuit 51 and the cooling circuit 3; a passage switching valve 54, a water pump 55 and a battery radiator 56 which are provided in the battery cooling water circulation circuit 51; a battery water temperature sensor 57; a battery temperature sensor 58; and a first flow rate control valve 59.

The battery cooling water circulation circuit 51 includes a first cooling water passage 51a, a second cooling water passage 51b, a third cooling water passage 51c, a fourth cooling water passage 51d, and a fifth cooling water passage 51e. The first cooling water passage 51a is a cooling water passage formed in a battery box which accommodates the battery B, and the first cooling water passage 51a promotes heat exchange between the cooling water and the battery B. The second cooling water passage 51b is a cooling water passage connecting the passage switching valve 54 and the inlet of the first cooling water passage 51a.

The passage switching valve 54 and the water pump 55 are provided in the second cooling water passage 51b sequentially from the outlet side of the battery radiator 56 toward the inlet side of the first cooling water passage 51a.

The third cooling water passage 51c is a cooling water passage connecting the outlet of the first cooling water passage 51a and the inlet of the cooling water of the battery radiator 56. The fourth cooling water passage 51d is a cooling water passage connecting the outlet of the cooling water of the battery radiator 56 and the passage switching valve 54. The fifth cooling water passage 51e is a cooling water passage connecting the third cooling water passage 51c and the passage switching valve 54.

The battery radiator 56 is provided near the front grille G in the engine room R. The cooling water flowing in from the third cooling water passage 51c is cooled by heat exchange with the traveling wind introduced from the front grille G in the process of flowing through the cooling water passage formed in the battery radiator 56 and flows out to the fourth cooling water passage 51d.

The water pump 55 operates in response to a command signal transmitted from the ECU 7 and pressure-feeds the cooling water in the second cooling water passage 51b from the side of the passage switching valve 54 to the side of the first cooling water passage 51a. The flow of the cooling water in the cooling water circulation passage 51 is formed by the water pump 55. The ECU 7 basically constantly keeps driving the water pump 55 from the start of the vehicle V to the stop of the vehicle V again and makes the cooling water circulate in the cooling water circulation passage 51.

The passage switching valve 54 is a three-way valve that operates in response to a command signal transmitted from the ECU 7 and can connect the second cooling water passage 51b to the fourth cooling water passage 51d or to the fifth cooling water passage 51e.

When the second cooling water passage 51b and the fourth cooling water passage 51d are connected by the passage switching valve 54, a cooling water circulation passage including the battery radiator 56 (the first cooling water passage 51a, the third cooling water passage 51c, the battery radiator 56, the fourth cooling water passage 51d, and the second cooling water passage 51b) is formed.

Further, when the second cooling water passage 51b and the fifth cooling water passage 51e are connected by the passage switching valve 54, a cooling water circulation passage not including the battery radiator 56 (the first cooling water passage 51a, the third cooling water passage 51c, the fifth cooling water passage 51e, and the second cooling water passage 51b) is formed.

The battery water temperature sensor 57 transmits to the ECU 7 a detection signal corresponding to the battery water temperature, which is the temperature of the cooling water flowing out from the outlet of the first cooling water passage 51a. The battery temperature sensor 58 transmits to the ECU 7 a detection signal corresponding to the battery temperature, which is the temperature of the battery B.

The first introduction passage 52 is a cooling water passage which is connected between the cooling water temperature sensor 36 and the thermostat valve 33 in the second cooling water passage 31b of the cooling circuit 3 and is connected to the second cooling water passage 51b of the first heat exchange circuit 5. A part of the cooling water flowing in the second cooling water passage 31b of the cooling circuit 3 is supplied into the battery cooling water circulation circuit 51 of the first heat exchange circuit 5 via the first introduction passage 52.

The first discharge passage 53 is a cooling water passage which connects the third cooling water passage 51c of the first heat exchange circuit 5 and a downstream side of a part where the first introduction passage 52 is connected in the second cooling water passage 31b of the cooling circuit 3. When the cooling water is supplied from the cooling circuit 3 to the battery cooling water circulation circuit 51 of the first heat exchange circuit 5 via the first introduction passage 52, a part of the cooling water circulating in the battery cooling water circulation circuit 51 discharges to the cooling circuit 3 via the first discharge passage 53.

The first flow rate control valve 59 is a valve which adjusts the flow rate of the cooling water flowing from the cooling circuit 3 to the first heat exchange circuit 5 and is provided in the first introduction passage 52. The opening degree of the first flow rate control valve 59 is controlled by the ECU 7. As described above, when the water pumps 34 and 55 are driven to circulate the cooling water in the cooling water circulation passage 31 of the cooling circuit 3 and the cooling water circulation passage 51 of the first heat exchange circuit 5 and the first flow rate control valve 59 is opened, a part of the cooling water flowing in the second cooling water passage 31b of the cooling circuit 3 is supplied to the second cooling water passage 51b of the first heat exchange circuit 5 via the first introduction passage 52, and a part of the cooling water flowing in the third cooling water passage 51c of the first heat exchange circuit 5 is supplied to the second cooling water passage 31b of the cooling circuit 3 via the first discharge passage 53.

As described above, in the first heat exchange circuit 5, the battery B can be cooled by circulating the cooling water in the cooling water circulation passage 51; in addition, the battery B can be heated by supplying the cooling water heated by the waste heat of the engine 2 from the cooling circuit 3 to the cooling water circulation passage 51 of the first heat exchange circuit 5. Therefore, a heater which heats the battery B is not provided in the first heat exchange circuit 5.

The ECU 7 is a computer which collectively controls the cooling circuit 3, the first heat exchange circuit 5, the second heat exchange circuit 4, and the grille shutter 6.

Figure 2:
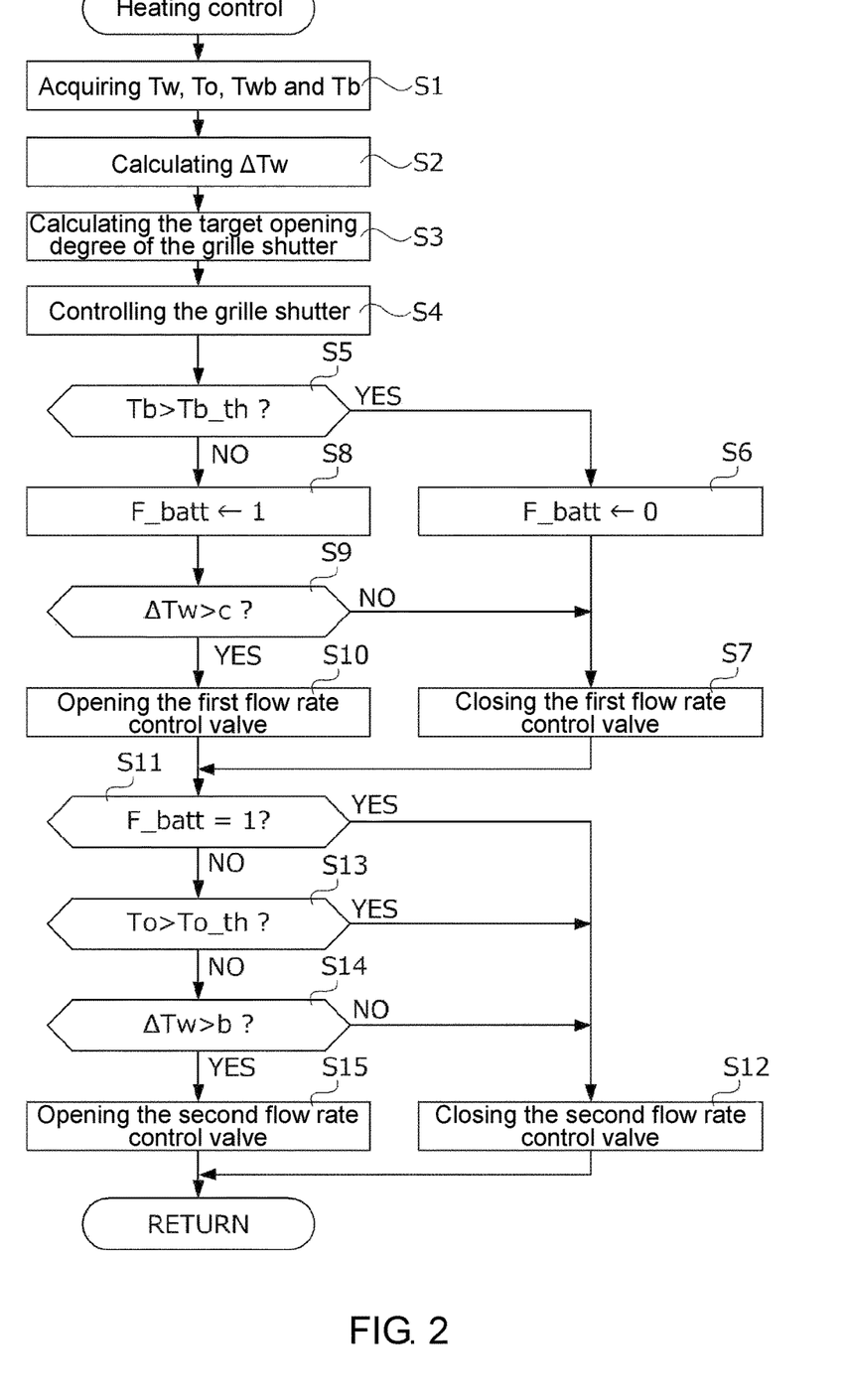
FIG. 2 is a flowchart showing a specific procedure of a heating control.

FIG. 2 is a flowchart showing a specific procedure of a heating control of the battery B and the transmission T by the ECU 7. The process shown in FIG. 2 is repeatedly executed by the ECU 7 at a predetermined control cycle after the start of the engine 2.

First, in S1, the ECU 7 acquires the cooling water temperature Tw, the oil temperature To, the battery water temperature Twb, and the battery temperature Tb by using the cooling water temperature sensor 36, the oil temperature sensor 47, the battery water temperature sensor 57, and the battery temperature sensor 58 and proceeds to S2.

In S2, the ECU 7 calculates the water temperature parameter $\Delta Tw$ by subtracting the valve opening temperature Tth1 of the thermostat valve 33 from the cooling water temperature Tw acquired in S1 ($\Delta Tw = Tw - Tth1$) and proceeds to S3.

In S3, the ECU 7 calculates the target opening degree of the grille shutter 6 based on the water temperature parameter $\Delta Tw$ calculated in S2 and proceeds to S4. More specifically, the ECU 7 calculates the target opening degree of the grille shutter 6 by, for example, searching the map illustrated in FIG. 3 based on the water temperature parameter $\Delta Tw$.

Figure 3:
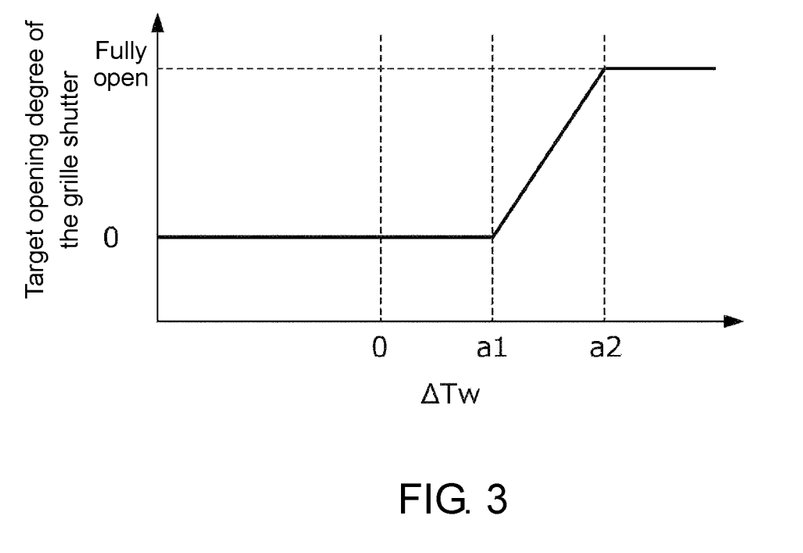
FIG. 3 is an example of a map for determining a target opening degree of a grille shutter.

As shown in FIG. 3, the ECU 7 sets the target opening degree of the grille shutter 6 as 0°, which indicates the fully closed opening degree, when the water temperature parameter ΔTw is less than or equal to a temperature threshold value a1 (such as 5° C.) slightly greater than 0. That is, the ECU 7 controls the grille shutter 6 to be in the fully closed state when the cooling water temperature Tw is less than or equal to Tth1+a1, which is greater than the valve opening temperature Tth1 of the thermostat valve 33 by the temperature threshold value a1.

Further, the ECU 7 increases the target opening degree of the grille shutter 6 as the water temperature parameter ΔTw increases when the water temperature parameter ΔTw is between the temperature threshold value a1 and a temperature threshold value a2 (such as 10° C.) which is slightly greater than the temperature threshold value a1, and the ECU 7 sets the target opening degree of the grille shutter 6 to the fully open opening degree when the water temperature parameter ΔTw is greater than or equal to the temperature threshold value a2. That is, the ECU 7 controls the grille shutter 6 to be in the open state when the cooling water temperature Tw is greater than Tth1+a1 and also controls the opening degree of the grille shutter 6 toward the open side as the cooling water temperature Tw increases so as to be in the fully open state when the cooling water temperature Tw becomes Tth1+a2, which is greater than the valve opening temperature Tth1 of the thermostat valve 33 by the temperature threshold value a2. Further, the ECU 7 controls the grille shutter 6 to be in the fully open state when the cooling water temperature Tw is greater than Tth1+a2.

In S4, the ECU 7 controls the opening degree of the grille shutter 6 to realize the target opening degree calculated in S3 and proceeds to S5.

In S5, the ECU 7 determines whether the battery temperature Tb is greater than a predetermined battery heating request temperature Tb_th. Here, the battery heating request temperature Tb_th is, for example, 0° C. When the determination result in S5 is YES, the ECU 7 determines that heating of the battery B is not required, sets the value of a battery heating request flag F_batt to "0" (with reference to S6), and then proceeds to S7. The battery heating request flag F_batt is a flag which clearly indicates a state where the heating of the battery B is requested. In S7, the ECU 7 controls the first flow rate control valve 59 to be in the fully closed state and proceeds to S11. Further, when the determination result in S5 is NO, the ECU 7 determines that heating of the battery B is required, sets the value of the battery heating request flag F_batt to "1" (with reference to S8), and then proceeds to S9.

In S9, the ECU 7 determines whether the water temperature parameter ΔTw is greater than a temperature threshold value c, that is, whether the cooling water temperature Tw is greater than Tth1+c, which is greater than the valve opening temperature Tth1 of the thermostat valve 33 by the temperature threshold value c. Here, the temperature threshold value c is set to greater than or equal to 0 and less than the temperature threshold value a1, and more specifically, to 3° C., for example, so that the first flow rate control valve 59 starts to open when the cooling water temperature Tw is greater than or equal to the valve opening temperature Tth1 of the thermostat valve 33 and less than the temperature (Tth1+a1) at which the grille shutter 6 starts to be opened. The ECU 7 proceeds to S10 when the determination result in S9 is YES, and the ECU 7 proceeds to S7 when it is NO and controls the first flow rate control valve 59 to be in the fully closed state as described above.

In S10, the ECU 7 controls the first flow rate control valve 59 to be in the valve opening state to start the heating control of the battery B and proceeds to S11. In this way, the cooling water of the cooling circuit 3 that has become high temperature due to the waste heat of the engine 2 is supplied to the first heat exchange circuit 5, and the battery B is heated by the heat exchange in the first cooling water passage 51a.

Here, when the first flow rate control valve 59 is controlled to be in the valve opening state as described above, the high temperature cooling water flows from the cooling circuit 3 to the first heat exchange circuit 5, and the low temperature cooling water flows from the first heat exchange circuit 5 to the cooling circuit 3. Therefore, the temperature of the cooling water circulating in the cooling circuit 3 temporarily decreases and becomes less than the valve opening temperature Tth1 of the thermostat valve 33, and there is a concern that this may impede the warm-up of the engine 2. Therefore, the ECU 7 controls the opening degree of the first flow rate control valve 59 based on the battery water temperature Twb so that the cooling water temperature Tw does not become less than or equal to the valve opening temperature Tth1 of the thermostat valve 33. More specifically, the opening degree of the first flow rate control valve 59 is controlled so that the opening degree of the first flow rate control valve 59 approaches the fully closed opening degree as the battery water temperature Twb decreases.

In S11, the ECU 7 determines whether the value of the battery heating request flag F_batt is "1". The ECU 7 proceeds to S12 when the determination result in S11 is YES, that is, when the battery temperature Tb is less than or equal to the battery heating request temperature Tb_th and the heating of the battery B is requested. In S12, the ECU 7 controls the second flow rate control valve 46 to be in the fully closed state so that the heating of the battery B is not impeded and ends the process of FIG. 2. In addition, the ECU 7 proceeds to S13 when the determination result in S11 is NO, that is, when the battery temperature Tb is greater than the battery heating request temperature Tb_th and the heating of the battery B is not requested.

In S13, the ECU 7 determines whether the oil temperature To is greater than a predetermined oil heating request temperature To_th. When the determination result in S13 is YES, the ECU 7 determines that heating of the oil of the transmission T is not required and proceeds to S12. In S12, the ECU 7 controls the second flow rate control valve 46 to be in the fully closed state and ends the process of FIG. 2. In addition, when the determination result in S13 is NO, the ECU 7 determines that heating of the oil of the transmission T is required and proceeds to S14.

In S14, the ECU 7 determines whether the water temperature parameter ΔTw is greater than a temperature threshold value b, that is, whether the cooling water temperature Tw is greater than Tth1+b, which is greater than the valve opening temperature Tth1 of the thermostat valve 33 by the temperature threshold value b. Here, the temperature threshold value b is set to greater than or equal to 0 and less than the temperature threshold value a1, and more specifically, to 3° C., for example, so that the second flow rate control valve 46 starts to open when the cooling water temperature Tw is greater than or equal to the valve opening temperature Tth1 of the thermostat valve 33 and less than the temperature (Tth1+a1) at which the grille shutter 6 starts to be opened. The ECU 7 proceeds to S15 when the determination result in S14 is YES, and the ECU 7 proceeds to S12 when it is NO and controls the second flow rate control valve 46 to be in the fully closed state as described above.

In S15, the ECU 7 controls the second flow rate control valve 46 to be in the valve opening state to start the heating control of the oil of the transmission T and ends the process of FIG. 2. In this way, the cooling water of the cooling circuit 3 that has become high temperature due to the waste heat of the engine 2 is supplied to the second heat exchange circuit 4, and the transmission T and its oil are heated via the oil heat exchanger 42 provided in the second heat exchange circuit 4.

Figure 4:
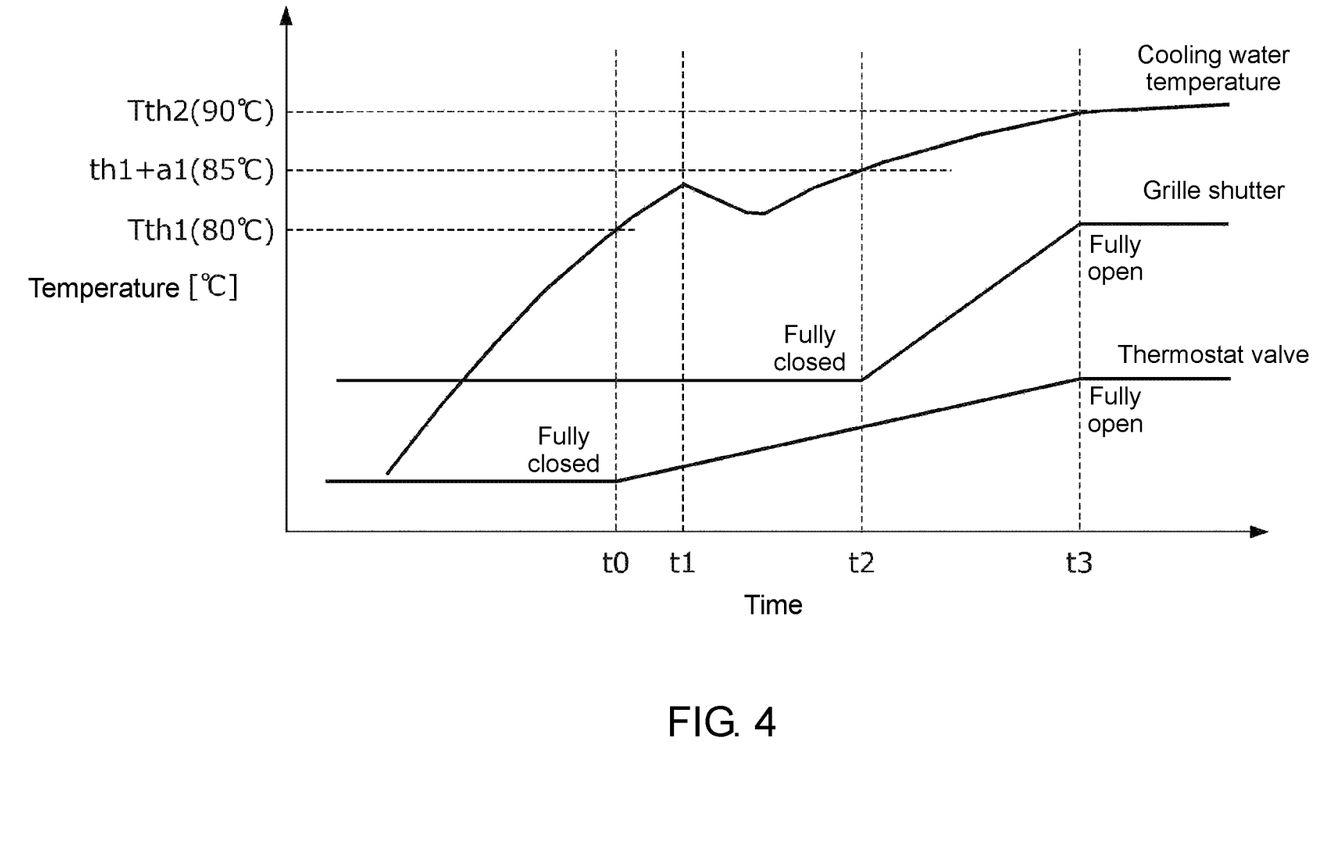
FIG. 4 is a time chart showing a specific example of the heating control of FIG. 2.

FIG. 4 is a time chart showing a specific example of the heating control of FIG. 2. FIG. 4 shows changes in the opening degree of the thermostat valve 33 and the opening degree of the grille shutter 6 in the process during which the cooling water temperature rises after the start of the engine. Further, FIG. 4 shows a case where the second flow rate control valve 46 is constantly controlled to be in the fully closed state regardless of the cooling water temperature.

In the example of FIG. 4, the cooling water temperature Tw at the time t0 exceeds the valve opening temperature Tth1 (such as 80° C.) of the thermostat valve 33. Thus, the thermostat valve 33 starts to open after the time t0. As described with reference to FIG. 2, the ECU 7 controls the opening degrees of the grille shutter 6 and the first flow rate control valve 59 to be in the fully closed state when the cooling water temperature Tw is less than the valve opening temperature of the thermostat valve 33. This promotes the rise of the cooling water temperature Tw.

Thereafter, at the time t1, the ECU 7 opens the first flow rate control valve 59 in response to the cooling water temperature Tw exceeding Tth1+c (such as 83° C.) at which the first flow rate control valve 59 starts to be opened so as to start the heating control of the battery B. In this way, after the time t1, the cooling water heated by the engine 2 is supplied from the cooling circuit 3 to the first heat exchange circuit 5, whereby the battery B is heated. Further, when the heating control of the battery B is started as described above, since the cooling water is supplied from the first heat exchange circuit 5 to the cooling circuit 3, the cooling water temperature Tw temporarily decreases as shown in FIG. 4. However, the ECU 7 starts the heating control in a state in which the cooling water temperature Tw has already exceeded the valve opening temperature of the thermostat valve 33 and in which the grille shutter 6 is closed. In addition, the ECU 7 controls the opening degree of the first flow rate control valve 59 based on the battery water temperature Twb so that the cooling water temperature Tw does not become less than or equal to the valve opening temperature of the thermostat valve 33. Therefore, the cooling water temperature Tw never becomes less than the valve opening temperature of the thermostat valve 33.

Further, when the battery temperature Tb exceeds the battery heating request temperature Tb_th by performing the heating control of the battery B as described above, the ECU 7 controls the second flow rate control valve 46 to be in the open state and heats the oil of the transmission T with the cooling water of the engine when the cooling water temperature Tw is greater than Tth1+b. In addition, when the battery temperature Tb is less than the battery heating request temperature Tb_th and the heating of the battery B is requested, the ECU 7 controls the second flow rate control valve 46 to be in the closed state and stops the flow of the cooling water from the cooling circuit 3 to the second heat exchange circuit 4. In this way, the heating control of the battery B can be performed with priority over the heating control of the transmission T.

Thereafter, at the time t2, the ECU 7 starts to open the grille shutter 6 in response to the cooling water temperature Tw exceeding Tth1+a1 (such as 85° C.) at which the grille shutter 6 starts to be opened. In this way, after the time t2, cooling of the engine 2 by the engine radiator 35 is promoted, and the rise of the cooling water temperature Tw becomes gentle.

Thereafter, at the time t3, the thermostat valve 33 and the grille shutter 6 become the fully open state in response to the cooling water temperature Tw being the fully open temperature Tth2 of the thermostat valve 33 and exceeding Tth1+a2 (such as 90° C.) which makes the grille shutter 6 to be in the fully open state.

According to the thermal management system 1 according to the embodiment, the following effects can be obtained.

(1) In the thermal management system 1, the first heat exchange circuit 5 in which the cooling water performing heat exchange with the battery B flows, the second heat exchange circuit 4 in which the cooling water performing heat exchange with the transmission T and the oil of the transmission T flows, and the engine radiator 35 are connected to the cooling circuit 3 of the engine 2; the flow rate of the cooling water flowing from the cooling circuit 3 to the first heat exchange circuit 5 is adjusted by the first flow rate control valve 59; the flow rate of the cooling water flowing from the cooling circuit 3 to the second heat exchange circuit 4 is adjusted by the second flow rate control valve 46; and the flow rate of the cooling water flowing from the cooling circuit 3 to the engine radiator 35 is adjusted by the thermostat valve 33. Further, the introduction amount of the outside air from the front grille G into the engine room R is adjusted by the grille shutter 6. In such a thermal management system 1, since the introduction amount of the outside air from the front grille G into the engine room R is limited when the grille shutter 6 is closed, the heat radiation amount from the engine 2 to the outside air is reduced; further, as the temperature rising rate of the cooling water flowing in the cooling circuit 3 increases, the heat discarded from the engine radiator 35 can be efficiently transferred to the vehicle devices, such as the battery B and the transmission T, and can heat these vehicle devices. However, if the grille shutter 6 is kept closed, the temperature of the cooling water may rise too much, and there is a concern that this may impede the cooling of the engine 2 by the engine radiator 35. Therefore, the ECU 7 starts to open the grille shutter 6 of the front grill G in response to the cooling water temperature Tw exceeding Tth1+a1, thereby able to secure the introduction amount of the outside air and to prevent the excessive temperature rise of the cooling water of the engine. Further, when the cooling water is supplied from the cooling circuit 3 to the heat exchange circuits 4 and 5, since the cooling water cooled by heat exchange with the transmission T and the battery B is supplied from the heat exchange circuits 4 and 5 to the cooling circuit 3, there is a concern that the temperature of the cooling water flowing in the cooling circuit 3 may decrease and that the warm-up of the engine 2 may be impeded. Therefore, the ECU 7 controls the grille shutter 6 and the flow rate control valves 46 and 59 to be in the fully closed state when the cooling water temperature Tw is less than the valve opening temperature of the thermostat valve 33, that is, before the cooling of the cooling water by the engine radiator 35 is started. This can prevent the warm-up of the engine 2 from being impeded.

(2) When the grille shutter 6 is controlled to be in the open state when the thermostat valve 33 is in the open state, the heat radiation amount from the engine 2 to the outside air increases, and the heat radiation amount from the cooling water by heat exchange with the outside air in the engine radiator 35 also increases; therefore, there is a concern that the cooling water temperature Tw may decrease and that the transmission T and the battery B may not be efficiently heated with the waste heat of the engine 2. In response to this, the thermal management system 1 controls the flow rate control valves 46 and 59 to be in the open state when the cooling water temperature Tw is greater than or equal to the valve opening temperature Tth1 of the thermostat valve 33 and less than the temperature (Tth1+a1) at which the grille shutter 6 starts to be opened. In this way, by controlling the grille shutter 6 to be in the open state, the waste heat of the engine 2 before being radiated to the outside air can be used to efficiently heat the transmission T and the battery B.

(3) The battery B of the vehicle V, which is a hybrid vehicle, may need to be heated as quickly as possible in order to exert its charge/discharge performance in some cases. Since the battery B has a large heat capacity, when the heating control of the battery B is performed and the cooling water is exchanged between the cooling circuit 3 and the first heat exchange circuit 5, the temperature of the cooling water in the cooling circuit 3 greatly decreases. As a result, the warm-up of the engine 2 is likely to be impeded. Therefore, according to the thermal management system 1, it is possible to heat the battery B with the cooling water that has become high temperature due to the engine 2 without impeding the warm-up and cooling of the engine 2.

(4) As described above, since the battery B has a large heat capacity, when the heating control is performed, the temperature of the cooling water in the cooling circuit 3 is likely to decrease. Further, there is a concern that the cooling water temperature Tw may decrease and become less than the valve opening temperature Tth1 of the thermostat valve 33, that this may impede the warm-up of the engine 2, and that the fuel efficiency may be deteriorated. Therefore, the ECU 7 controls the opening degree of the first flow rate control valve 59 so that the cooling water temperature Tw does not become less than or equal to the valve opening temperature Tth1 of the thermostat valve 33. In this way, the battery B can be heated without impeding the cooling of the engine 2.

(5) In the thermal management system 1, a heater which heats the battery B is not provided in the first heat exchange circuit 5. Therefore, according to the thermal management system 1, since the battery B can be heated by the waste heat of the engine 2 without using a heater, the energy efficiency of the entire vehicle can be improved.

(6) Though the hybrid vehicle is equipped with various devices, such as the battery B and the transmission T, as devices requesting heating at the time of start, among these various devices, it is preferable to heat the battery B in particular with priority in order to ensure the traveling performance of the hybrid vehicle immediately after the start. Further, when the second flow rate control valve 46 is controlled to be in the open state, the cooling water flows from the cooling circuit 3 of the engine 2 to the second heat exchange circuit 4, and the transmission T is heated by this cooling water. However, in this case, since the temperature of the cooling water decreases due to the heat exchange with the transmission T, there is a concern that the warm-up of the battery B may be impeded. Therefore, the ECU 7 controls the second flow rate control valve 46 to be in the closed state when the cooling water temperature Tw is less than the valve opening temperature Tth1 of the thermostat valve 33 and the battery temperature Tb is less than the battery heating request temperature Tb_th, and the ECU 7 controls the second flow rate control valve 46 to be in the open state when the cooling water temperature Tw is greater than the valve opening temperature Tth1 and the battery temperature Tb is greater than the battery heating request temperature Tb_th. In this way, since the second flow rate control valve 46 is controlled to be in the closed state at least until the battery B reaches the battery heating request temperature Tb_th, the battery B can be heated with priority.

<Second Embodiment>

Hereinafter, a second embodiment of the disclosure will be described with reference to the drawings.

Figure 5:
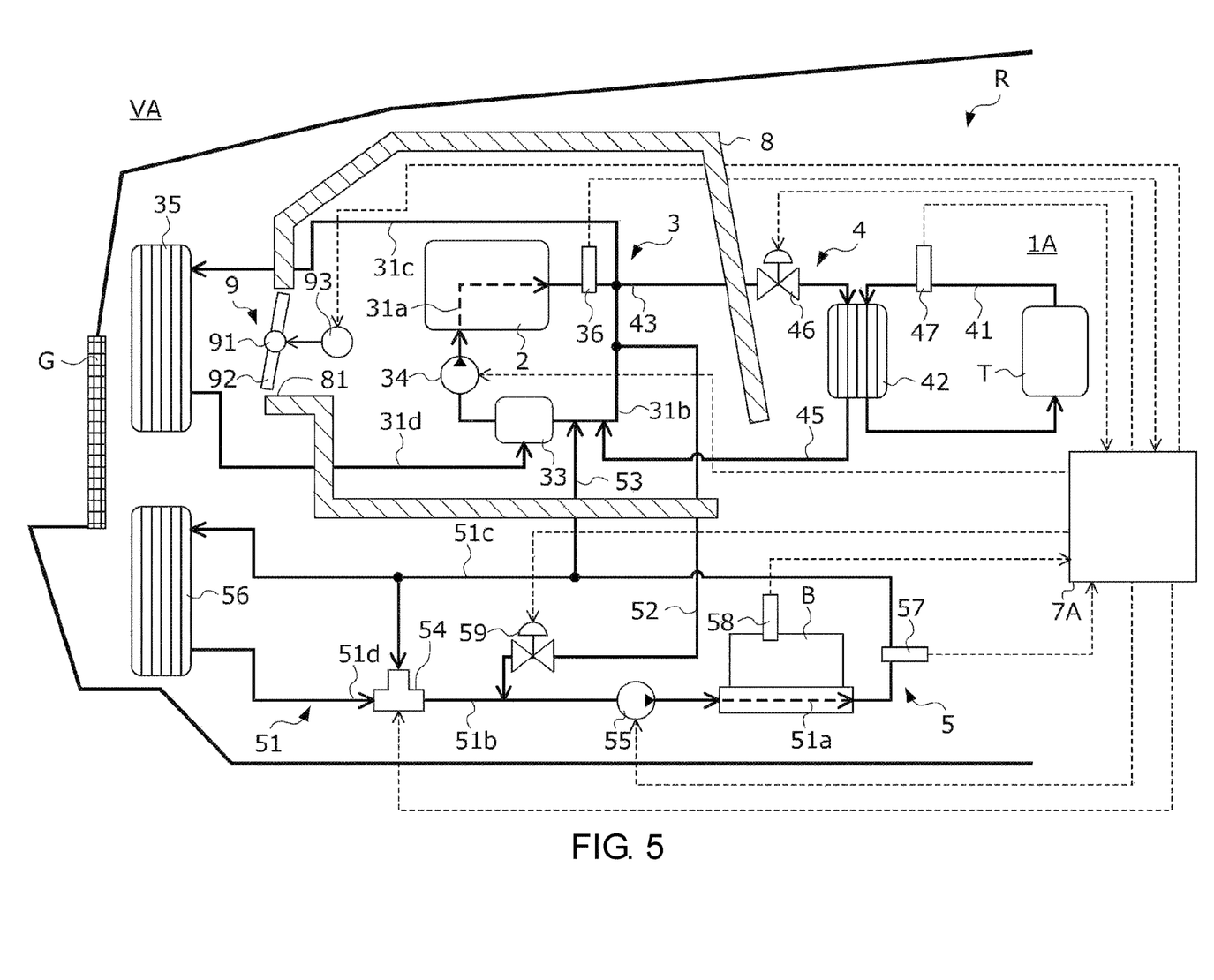
FIG. 5 is a diagram showing a configuration of a thermal management system according to a second embodiment of the disclosure and a vehicle equipped with the thermal management system.

FIG. 5 is a diagram showing a configuration of a thermal management system 1A according to the embodiment and a vehicle VA equipped with the thermal management system 1A. Further, in the following description of the thermal management system 1A, the same components as those of the thermal management system 1 according to the first embodiment are denoted by the same reference numerals, and descriptions thereof are omitted.

The thermal management system 1A includes a cooling circuit 3, an oil circulation circuit 41, a first heat exchange circuit 5, a second heat exchange circuit 4, a heat insulating capsule 8 provided in an engine room R, an outside air shutter 9 provided in the heat insulating capsule 8, and an ECU 7A which controls the cooling circuit 3, the first heat exchange circuit 5, and the outside air shutter 9.

The heat insulating capsule 8 is a heat retaining container made of a heat insulating material and accommodates at least the engine 2. More specifically, the heat insulating capsule 8 accommodates the engine 2 and the thermostat valve 33 and the water pump 34 of the cooling circuit 3. An outside air introduction port 81 is formed in a part of the heat insulating capsule 8 facing the front grille G.

The outside air shutter 9 includes a rotating shaft 91 provided in the outside air introduction port 81, a plate-shaped shutter member 92 rotatably provided with the rotating shaft 91 as the center, and an electric actuator 93 which rotates the shutter member 92 with the rotating shaft 91 as the center in response to a command signal transmitted from the ECU 7A.

When the opening degree of the shutter member 92 is set to a predetermined fully closed opening degree by the electric actuator 93, the shutter member 92 becomes substantially parallel to the opening surface of the outside air introduction port 81, as shown in FIG. 5. In this way, the introduction amount of the traveling wind from the front grille G into the engine room R and from the outside air introduction port 81 into the heat insulating capsule 8 becomes minimal. When the opening degree of the shutter member 92 is set to a predetermined fully open opening degree by the electric actuator 93, the shutter member 92 becomes substantially perpendicular to the opening surface of the outside air introduction port 81. In this way, the introduction amount of the traveling wind from the outside air introduction port 81 into the heat insulating capsule 8 becomes maximal. Therefore, the introduction amount of the traveling wind from the front grille G into the engine room R can be adjusted by controlling the opening degree of the shutter member 92 between the fully closed opening degree and the fully open opening degree under the control of the ECU 7A.

In addition, since the specific procedure of the heating control by the ECU 7A is substantially the same as the flowchart of FIG. 2, a detailed description is omitted. More specifically, the heating control by the ECU 7A is different from the heating control according to the first embodiment in that the introduction amount of the traveling wind into the heat insulating capsule 8 is adjusted by the outside air shutter 9, and the other parts are the same.

The thermal management system 1A according to this embodiment is different from the thermal management system 1 according to the first embodiment in that the engine 2 is accommodated in the heat insulating capsule 8 and that the introduction amount of the traveling wind from the outside air introduction port 81 formed in the heat insulating capsule 8 into the heat insulating capsule 8 is adjusted by the outside air shutter 9. Therefore, according to the thermal management system 1A, the same effects as the above (1) to (6) can be obtained.

Though an embodiment of the disclosure has been described above, the disclosure is not limited thereto. The configuration of the details may be appropriately modified within the scope of the effects of the disclosure.

What is claimed is:

1. A thermal management system for a vehicle, comprising: a cooling circuit in which cooling water performing heat exchange with an engine circulates; a heat exchange circuit which is connected to the cooling circuit and in which cooling water performing heat exchange with vehicle devices other than the engine flows; a flow rate control valve which adjusts a flow rate of cooling water flowing from the cooling circuit to the heat exchange circuit; a radiator which is connected to the cooling circuit to perform heat exchange between cooling water and the atmosphere; a radiator valve which adjusts a flow rate of cooling water flowing from the cooling circuit to the radiator; a shutter which adjusts an introduction amount of outside air from a front grille into an engine room; a cooling water temperature acquirer which acquires a cooling water temperature of the cooling circuit; and a controller which controls an opening degree of the flow rate control valve and an opening degree of the shutter, wherein the controller controls the shutter and the flow rate control valve to be in a closed state when the cooling water temperature is less than a valve opening temperature of the radiator valve and controls the shutter and the flow rate control valve to be in an open state when the cooling water temperature is greater than the valve opening temperature.

2. The thermal management system for the vehicle according to claim 1, wherein the controller controls the flow rate control valve to be in the open state when the cooling water temperature is greater than or equal to the valve opening temperature and less than a temperature at which the shutter is controlled to he in the open state and starts a heating control which supplies cooling water from the cooling circuit to the heat exchange circuit.

3. The thermal management system for Hail the vehicle according to claim 2, wherein the vehicle comprises the engine and a driving motor as driving force generation sources, the vehicle devices comprise an electric power storage device which supplies electric power to the driving motor, the heat exchange circuit comprises a first heat exchange circuit in which cooling water performing heat exchange with the electric power storage device flows, and the flow rate control valve comprises a first flow rate control valve which adjusts a flow rate of cooling water flowing from the cooling circuit to the first heat exchange circuit.

4. The thermal management system for Hall the vehicle according to claim 3, wherein the controller controls an opening degree of the first flow rate control valve so that the cooling water temperature does not become less than or equal to the Valve opening temperature.

5. The thermal management system for the vehicle according to claim 3, further comprising a heater which heats the electric power storage device is not provided in the first heat exchange circuit.

6. The thermal management system for the vehicle according to claim 3, wherein the heat exchange circuit further comprises a second heat exchange circuit in which cooling water performing heat exchange with another device among the vehicle devices other than the electric power storage device flows, and the flow rate control valve further comprises a second flow rate control valve which adjusts a flow rate of cooling water flowing from the cooling circuit to the second heat exchange circuit, wherein the controller controls the second flow rate control valve to be in a closed state when the cooling water temperature is less than the valve opening temperature and a temperature of the electric power storage device is less than a predetermined temperature and controls the second flow rate control valve to be in an open state when the cooling water temperature is greater than the valve, opening temperature and the temperature of the electric power storage device is greater than the predetermined temperature.

7. The thermal management system for the vehicle according to claim 1, wherein the vehicle comprises the engine and a driving motor as driving force generation sources, the vehicle devices comprise an electric power storage device which supplies electric power to the driving motor, the heat exchange circuit comprises a first heat exchange circuit in which cooling water performing heat exchange with the electric power storage device flows, and the flow rate control valve comprises a first flow rate control valve, Which adjusts a flow rate of cooling water flowing from the cooling circuit to the first heat exchange circuit.

8. The thermal management system for the vehicle according to claim 7, wherein the controller controls an opening degree of the first flow rate control valve so that the cooling water temperature does not become less than or equal to the valve opening temperature.

9. The thermal management system for the vehicle according to claim 7 further comprising a heater, which heats the electric power storage device is not provided in the first heat exchange circuit.

10. The thermal management system for the vehicle according to claim 7, wherein the heat exchange circuit further comprises a second heat exchange circuit in which cooling water performing heat exchange with another device among the vehicle devices other than the electric power storage device flows, and the flow rate control valve further comprises a second flow rate control valve, which adjusts a flow rate of cooling water flowing from the cooling circuit to the second heat exchange circuit, Wherein the controller controls the second flow rate control valve to be in a closed state when the cooling water temperature is less than the valve opening temperature and a temperature of the electric power storage device is less than a predetermined temperature and controls the second flow rate control valve to be in an open state when the cooling water temperature is greater than the valve opening temperature and the temperature of the electric power storage device is greater than the predetermined temperature.

11. A thermal management system for a vehicle, comprising: a cooling circuit in which cooling water performing heat exchange with an engine circulates; a heat exchange circuit which is connected to the cooling circuit and in which cooling water performing heat exchange with vehicle devices other than the engine flows; a flow rate control valve which adjusts a flow rate of cooling water flowing from the cooling circuit to the heat exchange circuit; a radiator which is connected to the cooling circuit to perform heat exchange between cooling water and the atmosphere; a radiator valve which adjusts a flow rate of cooling water flowing from the cooling circuit to the radiator; a heat retaining container which accommodates at least the engine; a shutter which adjusts an introduction amount of outside air from an outside air introduction port formed in the heat retaining container into the heat retaining container; a cooling water temperature acquirer which acquires a cooling water temperature of the cooling circuit; and a controller which controls an opening degree of the flow rate control valve and an opening degree of the shutter, wherein the controller controls the shutter and the flow rate control valve to be in a closed state when the cooling water temperature is less than a valve opening temperature of the radiator valve, and controls the shutter and the flow rate control valve to be in an open state when the cooling water temperature is greater than the valve opening temperature.

12. The thermal management system for the vehicle according to claim 11, wherein the controller controls the flow rate control valve to be in the open state when the cooling water temperature is greater than or equal to the valve opening temperature and less than a temperature at which the shutter is controlled to be in the open state and starts a heating control which supplies cooling water from the cooling circuit to the heat exchange circuit.

13. The thermal management system for the vehicle according to claim 12, wherein the vehicle comprises the engine and a driving motor as driving force generation sources, the vehicle devices comprise an electric power storage device which supplies electric power to the driving motor, the heat exchange circuit comprises a first heat exchange circuit in which cooling water performing, heat exchange with the electric power storage device flows, and the flow rate control valve comprises a first flow rate control valve which adjusts a flow rate of cooling water flowing from the cooling circuit to the first heat exchange circuit.

14. The thermal management system for the vehicle according to claim 13, wherein the controller controls an opening degree of the first flow rate control valve so that the cooling water temperature does not become less than or equal to the valve opening temperature.

15. The thermal management system for the vehicle according to claim 13, further comprising a heater which heats the electric power storage device is not provided in the first heat exchange circuit.

16. The thermal management system for the vehicle according to claim 13, wherein the heat exchange circuit further comprises a second heat exchange circuit in which cooling water performing, heat exchange with another device among the vehicle devices other than the electric power storage device flows, and the flow rate control valve further comprises a second flow rate control valve which adjusts a flow rate of cooling water flowing from the cooling circuit to the second heat exchange circuit, wherein the controller controls the second flow rate control valve to be in a closed state when the cooling water temperature is less than the valve opening temperature and a temperature of the electric power storage device is less than a predetermined temperature and controls the second flow rate control valve to be in an open state when the cooling water temperature is greater than the valve opening temperature and the temperature of the electric power storage device is greater than the predetermined temperature.

17. The thermal management system for the vehicle according to claim 11, wherein the vehicle comprises the and a driving motor as driving force generation sources, the vehicle devices comprise an electric power storage device which supplies electric power to the driving motor, the heat exchange circuit comprises a first heat exchange circuit in which cooling water performing heat exchange with the electric power storage device flows, and the flow rate control valve comprises a first flow rate control valve which adjusts a flow rate of cooling water flowing from the cooling circuit to the first heat exchange circuit.

18. The thermal management system for the vehicle according to claim 17, wherein the controller controls an opening degree of the first flow rate control valve so that the cooling water temperature does not become less than or equal to the Valve opening temperature.

19. The thermal management system for the vehicle according to claim 17, further comprising a heater which heats the electric power storage device is not provided in the first heat exchange circuit.

20. The thermal management system for the vehicle according to claim 17, wherein the heat exchange circuit farther comprises a second heat exchange circuit in which cooling water performing heat exchange with another device among the vehicle devices other than the electric power storage device flows, and the flow rate control valve further comprises a second flow rate control valve which adjusts a flow rate of cooling water flowing from the cooling circuit to the second heat exchange circuit, wherein the controller controls the second flow rate control valve to be in a closed state when the cooling water temperature is less than the valve opening temperature and a temperature of the electric power storage device is less than a predetermined temperature and controls the second flow rate control valve to be in an open state when the cooling water temperature is greater than the valve opening temperature and the temperature of the electric power storage device is greater than the predetermined temperature.

* * * * *